United States Patent [19]

Antonsson et al.

[11] 3,874,798
[45] Apr. 1, 1975

[54] METHOD AND APPARATUS FOR CONTACTLESS MEASURING OF AN OBJECT USING SEPARATE OPTO-ELECTRICAL DEVICES FOR RESPECTIVE BORDERS OF OBJECT

[75] Inventors: Leif-Goran Antonsson, Fagersta; Joel Karl Gosta Redlund, Norberg; Karl Yngve Kjell Rosengren, Fagersta, all of Sweden

[73] Assignee: AGA AB, Agavagen, Lidingo, Sweden

[22] Filed: June 6, 1973

[21] Appl. No.: 367,648

[30] Foreign Application Priority Data
July 3, 1972 Sweden.............................. 8692/72

[52] U.S. Cl.................. 356/159, 250/560, 356/160
[51] Int. Cl....................... G01b 11/04, G01b 11/10
[58] Field of Search.................... 356/159, 160, 167; 250/560

[56] References Cited
UNITED STATES PATENTS

| | | |
|---|---|---|
| 2,552,238 | 5/1951 | Turner et al................. 350/175 TS |
| 3,141,057 | 7/1964 | Action................................ 356/159 |
| 3,224,322 | 12/1965 | Westbrook.......................... 356/160 |
| 3,311,749 | 3/1967 | Briggs................................ 356/159 |
| 3,428,817 | 2/1969 | Hofmeister et al................ 250/560 |
| 3,673,417 | 6/1972 | Wahli.......................... 350/175 TS |

FOREIGN PATENTS OR APPLICATIONS
58,603   11/1967   Germany.......................... 356/160

*Primary Examiner*—Vincent P. McGraw
*Attorney, Agent, or Firm*—Flynn & Frishauf

[57] ABSTRACT

A method and apparatus for contactless measuring of a dimension of movable objects wherein opposite borders of an image of a movable object are projected in one dimension upon a respective one of a pair of opto-electrical devices, each of the opto-electrical devices being comprised of an array of light sensitive elements. The opto-electrical devices are scanned successively at a predetermined repetition rate, the scanning being performed with a simultaneous start from that end of each opto-electrical device which is covered or shadowed by the image of the object. The signals from the illuminated and shadowed-out light sensitive elements of the opto-electrical devices are then detected and the dimension of the object is then determined.

12 Claims, 2 Drawing Figures

3,874,798

METHOD AND APPARATUS FOR CONTACTLESS MEASURING OF AN OBJECT USING SEPARATE OPTO-ELECTRICAL DEVICES FOR RESPECTIVE BORDERS OF OBJECT

The present invention relates to a method and an apparatus for contactless measuring of the dimensions of movable objects, especially objects having a temperature above 500°C. The invention refers more particularly to a method and an apparatus for measuring the diameter of wire in wire rolling mills. Such a method is described in the Swedish patent application Ser. No. 67/71 corresponding to U.S. application Ser. No. 268,275, filed July 3, 1972, now abandoned, and the present method and apparatus is an improvement of said method.

The object to be measured in a wire rolling mill, i.e. a bar section, is in an environment that is very unsuitable for any instrument as it is surrounded by water splash, vibrations, dust and heat. Moreover the bar section has a rolling finishing velocity of up to 25–30 m/s and vibrates in the vertical as well as in the horizontal direction. The realization of a method and apparatus for measuring the dimension of the moving bar section would provide several operational advantages. For example, a continuous supervision of the dimensions of the bar section could give an alarm at the occurrence of fins which indicate a serious impairment of quality. Moreover when changing over to another steel grade the new setting of the pair of rolls could be done much quicker when having a continuous information of the dimensions of the bar section. Wear during the rolling operation could be followed and data obtained for a more economical control of the shifting operation of the rolls. Further, successful measurements at several points in the rolling mill would constitute a basis for automatic control of the whole rolling process.

A number of methods have been proposed for measuring the dimension of rolled wire in wire rolling mills. In e.g. the Journal Stahl und Eisen, No. 20, October 1968, a method is described for optical measuring of the thickness when rolling. According to this method the light from the bar section is reproduced on a phototransistor by means of a rotating polygonal mirror. Due to the rotation of the mirror a prolonged signal is obtained which corresponds to the width of the bar section. A drawback with this type of measuring is the fact that it is of a non-analogue type, which impies that the output signal does not continuously correspond to a measurement test value. According to this method a scanning is moreover obtained across the test object, said scanning being dependent upon the velocity of rotation of the polygonal mirror and the number of mirrors in the polygon. A substantial drawback of this known system is moreover that the rotation of the parts must be maintained in an unsuitable invironment for such operation.

A measuring method which is based upon non-movable parts is described in the Journal "Instrument and Control System", 1967. According to this method a special phototube comprising a photocathode electron a photo multiplier is used. The border of the test object is then projected onto the photocathode and the electror image is deflected towards a centre of the electron multiplier by means of a servo mechanism, wherein the control signal for the deflection constitutes the test signal. However, the equipment required to carry out this method is expensive and complicated.

The object of the present invention is to provide an inexpensive, space saving and operationally reliable method and apparatus for contactless measuring of the dimensions of a bar section, and more particularly the moving bar section in a wire rolling mill.

SUMMARY OF THE INVENTION

In the method and apparatus according to the invention an image of the movable object is projected in one dimension upon an opto-electrical component means which is comprised of an array of light sensitive elements, the luminous intensity of said opto-electrical component means is scanned successively at a predetermined repetition rate, the signals from illuminated and shadowed out light sensitive elements are detected for registering the relative positions of the borders of the object, and the dimension of the object is determined wherein the borders of the object are projected upon the opto-electrical component means through a lens system comprising a tele-centric diaphragm means, whereby errors in measurement caused by movement of the object along the optical axis of the system are suppressed.

BRIED DESCRIPTION OF THE DRAWINGS

FIG. 1 is a vertical section through the apparatus illustrating how the bar section is projected upon the opto-electrical components; and FIG. 2 is a block diagram illustrating the signal processing means.

DETAILED DESCRIPTION

Figure 1:
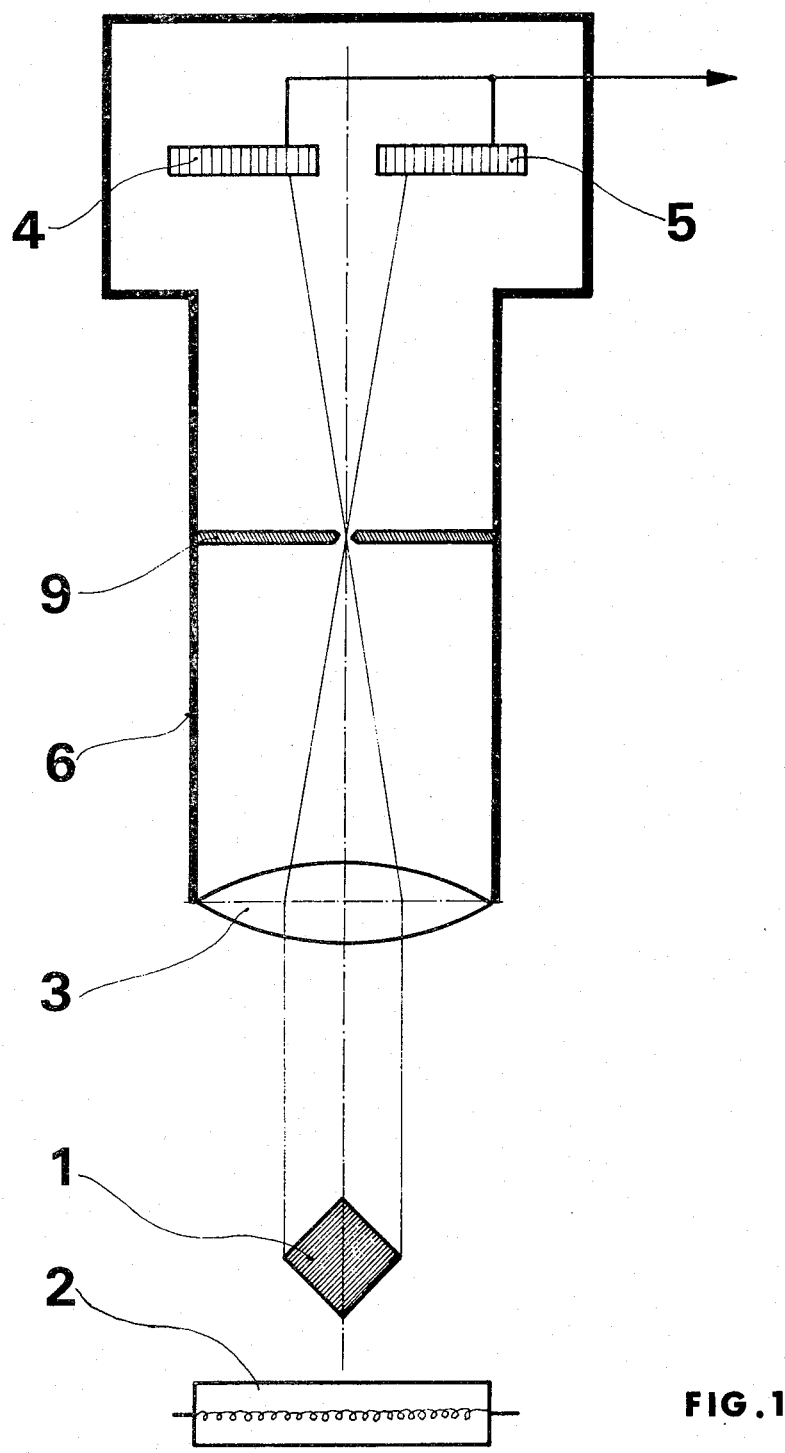
Figure 2:
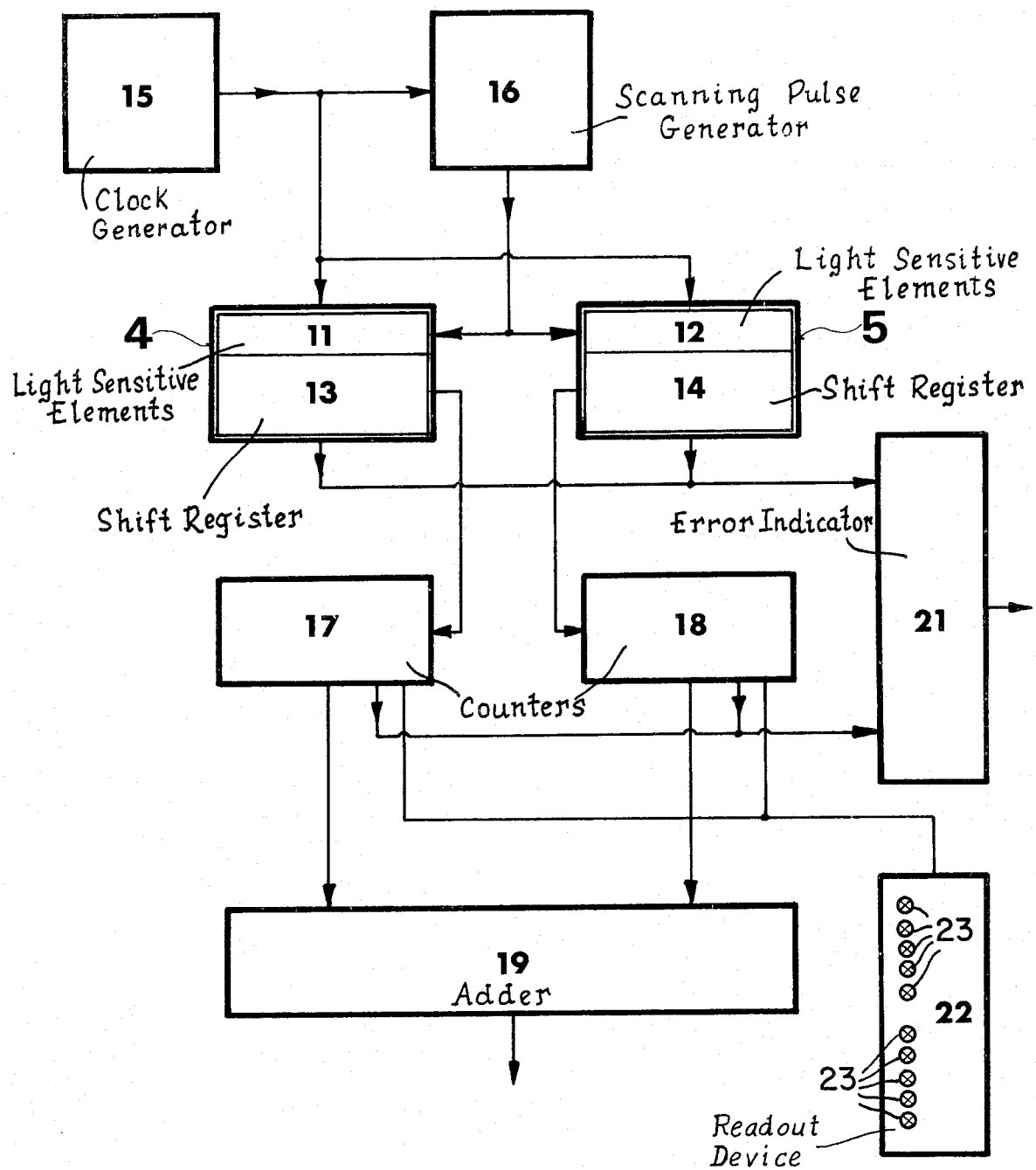

FIG. 1 illustrates how the shadow of bar section 1 is reproduced by means of back ground projection lamp 2, a lens system 3 and a telecentric diaphragm 9 upon two opto-electrical devices or components 4 and 5 in a scanner 6. The opto-electrical components are preferably comprised of lines of photo diodes which are arranged perpendicularly to the direction of running of the bar section 1. The signals from the opto-electrical components 4 and 5 are transmitted to a signal processor which is illustrated in FIG. 2. The tele-centric diaphragm is such that the measurement of the bar section is independent of the position of the section along the axis of the optical system i.e. in the instant embodiment of the vertical position of the bar section.

Scanner 6 may utilize a tube of the type described in French patent application PV 149628. This tube has a target in which a surface array of photo-diodes is scanned by an electron beam, and an output is obtained in accordance with the light falling on the photo diodes. By scanning the opto-electrical components 4 and 5 (which correspond to the diode elements in the before mentioned patent application) by a beam having a predetermined recurrent clock rate, and counting the output pulses from the diode array of the opto-electrical elements 4 and 5, an output may be obtained in discrete pulses of two levels, one level corresponding to illumination of a photo diode and the other lever to non-illumination (i.e. the area where the shadow of bar section 1 obscures the diode elements of the array). The pulses with their discrete values are then counted in a signal processor according to FIG. 2.

Other patents which disclose and show tubes suitable for use in the embodiment of the present invention are U.S. Pat. Nos. 3,440,476; 3,403,284; 3,377,513; and 3,467,880.

It is also possible to reproduce the bar section as a light object against a dark background but at high scanning rates the weak light from the bar section is insufficient for actuation of the photodiodes. As is clear from the drawing the lines of photodiodes are arranged perpendicularly to the direction of running of the bar section.

The measurement principle of the present invention resides in that the lines of photodiodes are partly illuminated and partly shadowed out. Through appropriate signal processing the signals from illuminated and shadowed out photodiodes can then be detected and processed. The number of illuminated and shadowed out diode lines is proportional to the dimension of the object.

According to a preferred embodiment the two opto-electrical components 4 and 5 each have 50 photodiode lines with an even line spacing of 0.1 mm, the operative length of the component being about 5 mm.

Moreover, at both ends of the photodiode line there is an additional photodiode for signaling when the projection of the bar section is outside the test line. Through an appropriate combination of a lens system is proportion to thea number of photodiodes per unit of length along the line of components, the resolution of the present system can be varied within wide limits.

FIG. 2 illustrates the signal processor in which two arrays of light sensitive elements 11 and 12 together with their shift registers 13 and 14 constitute the opto-electrical components 4 and 5 and are controlled by a clock frequency generator 15. Said generator 15 also controls a scanning pulse generator 16 which injects a pulse when starting the measurement process. Information from the shift registers 13 and 14 is then transmitted over to counters 17 and 18 respectively and is thereafter summed up in an adder 19.

Error indicator 21 delivers an accept signal if the stipulations for acceptance are fulfilled. Device 22 includes a number of lamps 23 by means of which the relative position of the bar 1 in relation to the opto-electrical components 4 and 5 is read out.

As mentioned above the measurement principle of the present invention resides in that the lines of photodiodes are partly illuminated and partly shadowed out and by means of the signal processing the shadowed out diodes are counted and related to the dimensions of the bar section. The resolution can be varied within wide limits by enlarging and reducing by means of the lens system and by varying the number of discrete diodes. Due to the telecentric diaphragm the position of the bar section along the axis of the optical system does not have any effect on the measurement. The measurement process will thus be substantially independent of vibrations of the bar section partly due to the high scanning rate and partly due to the telecentric diaphragm means.

The signals from the shadowed out diodes are fed into the counters 17 and 18 by means of the shift registers 13 and 14 respectively, wherein they are counted. The signals are then summed up in parallel form in the adder circuit 19.

The scanning of the opto-electrical components 4 and 5 starts simultaneously at those ends of the components which are shadowed out by the image of the bar section. This makes it possible to clamp the test signal in a suppression unit at a level which corresponds to an illuminated diode during the remaining part of the scanning operation after having attained said level. In that way the operators are blocked for such defects as roll scales etc. The simultaneous scanning start makes it also possible to obtain a more simultaneous measurement of the position of the borders of the bar section compared with a scanning which starts first at one opto-electrical component and then at the other. The position of one border of the bar section can be determined only by summing up the number of shadowed out photodiodes at one opto-electrical component.

By bringing together various conditions or stipulations in an error adder 21 when performing the measurement the apparatus can be supplemented by a "measurement accepted" signal.

1. The condition that the first counted-in bit at both counters indicates shadow while the last counted-in bit indicates light, is made to show that the shadow of the bar section falls correctly upon both opto-electrical components.

2. The condition that both of the first bits in the counters indicate light is made to show that no bar section exists.

3. The condition that the scanning pulse simultaneously reaches the end of both shift registers is made to show that said registers are correct.

4. The condition that both counters are completely filled when the background projection is switched off is made to show that all photodiodes are properly operative.

The shift register is built-in in the opto-electrical components used. By bringing together the signals according to conditions in points 3 and 4 above it is then possible to check if a component is properly operative.

Signals according to conditions in points 1, 2 and 3 above are brought together and made to indicate, by means of the error indicator 21, that the performed measurement is O.K.

In order to simplify the adjustment when assembling the apparatus so that the image of the bar section falls as symmetrically as possibly upon the opto-electrical component, during a test period the registers are made to control a lamp panel 22 in which the lamps 23 give an indication of the variations of the bar section and how large said deviations are.

What is claimed is:

1. A method for contactless measuring of a dimension of movable objects comprising:
   projecting opposite borders of an image of a movable object in one dimension upon a respective one of a pair of opto-electrical devices, each of said opto-electrical devices being comprised of an array of light sensitive elements;
   scanning the luminous intensity of each of said opto-electrical devices successively at a predetermined repetition rate, the scanning being performed with simultaneous start from that end of each opto-electrical device which is covered or shadowed by the image of the object;
   detecting the signals from illuminated and shadowed out light sensitive elements for registering the relative positions of the borders of the object; and
   determining the dimension of the object from the results of the detecting step.

2. A method according to claim 1 comprising stopping the scanning of each opto-electrical device as soon as an illuminated light sensitive element is detected so that shadowing roll scales, etc., outside the test object, do not have any effect on the results of measurement.

3. A method according to claim 1 comprising sensing the position of the shadow of the object at fixed intervals along the opto-electrical device; and supplying the sensed position to indicator lamps which indicate when the object is positioned symmetrically with regard to the opto-electrical devices.

4. A method according to claim 1 comprising generating test value validity information for each measurement, said test value validity information comprising information as to at least one of (a) no test object exists at the apparatus, (b) the shadow of the test object lies incorrectly and covers completely or not at all one of the opto-electrical components and (c) error in the shift register of the opto-electrical component.

5. A method according to claim 4 comprising clamping the test signal during the remaining part of the scanning in a suppression unit at a level which corresponds to an illuminated light sensitive element after having attained said level.

6. A method according to claim 1 wherein said image is projected upon said opto-electfical devices through a lens system which includes a telecentric diaphragm means so that errors caused by movements of the object section along the axis of the optical system are suppressed.

7. Apparatus for contactless measuring of a dimension of a movable object comprising:
at least a pair of opto-electrical devices, each of which is comprised of an array of light sensitive elements;
projecting means for projecting respective opposite borders of an optical image of the movable object in one dimension upon a separate one of said opto-electrical devices;
scanning means for successively scanning the luminous intensity of said light sensitive elements of said pair of opto-electrical devices at a predetemined repetition rate, the scanning being performed with simultaneous start from that end of each opto-electrical device which is covered or shadowed by the image of the object;
means for detecting the illuminated and shadowed out light sensitive elements for registering the relative positions of the border of the object; and
means responsive to said detecting and registering means for determining the dimension of the object.

8. Apparatus according to claim 7 wherein said detecting and registering means includes a shift register in each opto-electrical device coupled to the outputs of the respective light sensitive elements.

9. Apparatus according to claim 7, including a clock-frequency generator coupled to and controlling the opto-electrical devices and said scanning means.

10. Apparatus according to claim 7 wherein said dimension determining means includes two counters, each receiving information from a separate one of the opto-electrical devices; and an adder coupled to receive the output information from said counters in parallel form to produce a sum indication representing said dimension of the object.

11. Apparatus according to claim 7 wherein said projecting means includes a telecentric diaphragm means for suppressing errors caused by movements of the object along the axis of the optical system.

12. Apparatus according to claim 7 wherein said light sensitive elements comprise photo diodes.

* * * * *